3,078,153
CONTROLLING VEGETATION WITH HYDRO-
CARBON MONO-NITROGEN HETEROCY-
CLIC AMINOCARBODITHIOATES
Marion W. Harman, Nitro, and John J. D'Amico, Charleston, W. Va., assignors to Monsanto Chemical Company, St. Louis, Mo., a corporation of Delaware
No Drawing. Filed Oct. 8, 1959, Ser. No. 845,079
9 Claims. (Cl. 71—2.5)

This invention relates to methods of destroying or controlling vegetation and to herbicidal compositions. More particularly it relates to methods of destroying or controlling vegetation which comprises applying thereto a toxic concentration of a phytotoxic ester of a dithiocarbamic acid.

General objects of the invention are to provide useful compositions which are toxic to living plants and to provide methods for their use to accomplish various desirable results. A further object is to provide compositions and methods for the destruction of noxious vegetation. Another object is to destroy weeds by applying a toxic concentration of the composition to foliage after emergence. A particular object of the invention is to provide outstanding grass-specific pre-emergence herbicides and methods for using them. A further particular object is to control weeds growing in cotton, radish and corn fields without injuring the crop. Other and further objects will be apparent from the detailed description which follows.

A method of destroying or controlling undesired vegetation, according to this invention, comprises applying thereto a toxic concentration of a phytotoxic ester of a dithiocarbamic acid possessing the general formula

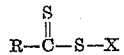

R in the above formula represents a hydrocarbon mononitrogen heterocyclic radical. Examples of R are the radicals derived by removal of the hydrogen from the nitrogen of ethylenimine, tetrahydropyridine, pyrrolidine, 2-methylpyrrolidine, 2,3-dimethylpyrrolidine, 2,5-dimethylpyrrolidine, piperidine, 2-methylpiperidine, 4-methylpiperidine, 5-ethyl-2-methylpiperidine, 5-ethyl-3-methylpiperidine, 2,3-dimethylpiperidine, 2,4-dimethylpiperidine, 2,4,6-trimethylpiperidine and hexamethylenimine. X may be lower alkyl, lower monoolefinic hydrocarbon or halogen substituted lower monoolefinic hydrocarbon. Examples are methyl, ethyl, butyl, propyl, isopropyl, allyl, 2-chlorallyl, 2-bromoallyl, 2-fluoroallyl, 2-iodoallyl, 3-chloroallyl, 3-bromoallyl, 3-fluoroallyl, 3-iodoallyl, 3-chloro-2-butenyl, 3-bromo-2-butenyl, 3-fluoro-2-butenyl, 3-iodo-2-butenyl, 2,3-dichloroallyl, 3,3-dichloroallyl, 2,3-dichloro-2-butenyl, 2,3-diiodo-2-butenyl, 2-fluoro-3-chloroallyl, 2,3-dibromoallyl, 3,4,5-trifluoro-3-butenyl and 2,3,3-trichloroallyl.

The phytotoxic esters of this invention comprise weed killers having both pre-emergent and post-emergent activity. Accordingly, by applying the toxicant to the plant is meant any means whereby the toxicant is brought into contact with living plants which latter include germinating seedlings, as for example by application to the ground before the plants emerge or by direct application to the foliage. In general, the compounds are outstanding grass-specific pre-emergence herbicides. They also control one of the most prevalent broadleaf weed families, pigweed. The grasses controlled include the three major Midwest weedy grasses, crab grass, foxtail and barnyard grass. Tillering and other formative effects are often observed and by careful control of the concentration, the compositions can be used for sterilization of the soil where desirable.

The toxicants may be applied conveniently in the form of a spray containing the active ingredient in a concentration within the range of 0.1–10.0% by weight. Thorough coverage of the foliage is effective for contact killing. For pre-emergence control of plants amounts within the range of ¼ to 100 pounds per acre may be used and within the range of 30–100 pounds the compounds effect soil sterilization.

Although most of the esters are insoluble in water, they are soluble in common organic solvents. They may be dispersed directly in water or a solution in an organic solvent emulsified in aqueous medium by the aid of a dispersing agent. As dispersing and wetting agents there may be employed soft or hard sodium or potassium soaps, alkylated aromatic sodium sulfonates such as sodium dodecylbenzenesulfonate, an amine salt, as for example dibutylammonium dodecylbenzenesulfonate, alkali metal salts of sulfated fatty alcohols, ethylene oxide condensation products of any of the following: alkyl phenols, tall oil and higher mercaptans. These are illustrative only of a large class of materials available and it will be appreciated that other dispersing and wetting agents may be used. Formulation of dry compositions is accomplished by mixing with finely divided or ganular solid carriers. Suitable carriers comprise talc, clay, pyrophyllite, silica and fuller's earth. Usually the toxicant will be only a minor proportion. The dry formulation may be applied directly or dispersed in aqueous medium before application. If the latter, it is advantageous to incorporate a wetting or dispersing aid into the formulation.

Table I illustrates the pre-emergent herbicidal activity of typical examples. The ester was emulsified in water and the emulsion applied as a spray. In this manner, the active ingredient was applied to the ground of seeded plots before any plants emerged. The plants studied included most of the following in each test: morning glory, wild oat, brome grass, rye grass, mustard (radish), beetsugar, corn, foxtail, barnyard grass, crab grass, pigweed, cotton and wild buckwheat. Fourteen days after application of the toxicants results were observed and recorded. The number of seeds emerging was converted to weighted herbicidal ratings based on average percent germination of any particular seed lot times an injury factor. This evened irregularities of herbicide ratings of seeds which varied in percent germination. The injury factor takes into consideration any plants not expected to survive. Thus, phytotoxicity ratings were based on the number of plants which emerged and would survive as observed two weeks after planting. Herbicidal ratings were assigned by means of the following conversion scale:

Percent emergence: Phytotoxicity ratings
0–25% _____ 3 or severe.
26–50% _____ 2 or moderate.
51–75% _____ 1 or slight.
76–100% _____ 0 or none.

Table I

| Active ingredient | Lbs./acre | Results observed |
|---|---|---|
| Allyl 1-pyrrolidine-carbodithioate. | 25 | Severe phytotoxicity to wild oats, brome grass, rye grass, beetsugar, foxtail, barnyard grass, crab grass and pigweed. |
| 3,3-dichloroallyl 1-pyrrolidine-carbodithioate. | 25 | Severe phytotoxicity to morning glory, rye grass, foxtail, barnyard grass, crab grass and pigweed. |
| Cis- and trans-2,3-dichloroallyl 1-pyrrolidine-carbodithioate. | 25 | Severe phytotoxicity to brome grass, foxtail, barnyard grass, crab grass and pigweed; moderate phytotoxicity to morning glory and rye grass. |
| Allyl 1-piperidine-carbodithioate. | 25 | Severe phytotoxicity to wild oats, brome grass, rye grass, beetsugar, foxtail, barnyard grass, crab grass and pigweed; moderate phytotoxicity to morning glory. |
| 2-chloroallyl 1-piperidine-carbodithioate. | 25 | Severe phytotoxicity to brome grass, rye grass, foxtail, barnyard grass, crab grass and pigweed; moderate phytotoxicity to ld oats. |

Table I—Continued

| Active ingredient | Lbs./acre | Results observed |
|---|---|---|
| Cis- and trans-2,3-dichloroallyl 1-piperidine-carbodithioate. | 25 | Severe phytotoxicity to brome grass, rye grass, barnyard grass; moderate phytotoxicity to morning glory, foxtail, crab grass and pigweed. |
| 3,3-dichloroallyl 1-piperidine-carbodithioate. | 10 | Severe phytotoxicity to rye grass, barnyard grass and crab grass. |
| Allyl 5-ethyl-2-methyl-1-piperidine-carbodithioate. | 25 | Severe phytotoxicity to morning glory, wild oats, brome grass, rye grass, beet-sugar, foxtail, barnyard grass, crab grass and pigweed. |
| 2-chloroallyl 5-ethyl-2-methyl-1-piperidine-carbodithioate. | 3 | Severe phytotoxicity to wild oats, brome grass, rye grass, foxtail, barnyard grass, crab grass and pigweed; moderate phytotoxicity to beet-sugar. |
| 3-chloro-2-butenyl 5-ethyl-2-methyl-1-piperidine-carbodithioate. | 25 | Severe phytotoxicity to wild oats, brome grass, rye grass, foxtail, barnyard grass and crab grass. |
| 2,3-dichloroallyl 5-ethyl-2-methyl-1-piperidine-carbodithioate. | 25 | Severe phytotoxicity to wild oats brome grass, rye grass, foxtail, barnyard grass, crab grass, pigweed and buckwheat. |
| 3-chloroallyl 5-ethyl-2-methyl-1-piperidine-carbodithioate. | 25 | Severe phytotoxicity to wild oats, brome grass, rye grass, foxtail, barnyard grass, crab grass and pigweed, moderate phytotoxicity to beet-sugar and buckwheat. |
| Methyl 5-ethyl-2-methyl-1-piperidinecarbodithioate. | 25 | Severe phytotoxicity to morning glory, wild oats, brome grass, rye grass, foxtail, barnyard grass, crab grass and pigweed; moderate phytotoxicity to buckwheat and beet-sugar. |
| Ethyl 5-ethyl-2-methyl-1-piperidinecarbodithioate. | 5 | Severe phytotoxicity to wild oats, brome grass, rye grass, foxtail, barnyard grass and crab grass; moderate phytotoxicity to morning glory and pigweed. |
| 3,3-dichloroallyl 5-ethyl-2-methyl-1-piperidine-carbodithioate. | 25 | Severe phytotoxicity to wild oats, brome grass, rye grass, foxtail, barnyard grass, crab grass and pigweed. |
| 2-chloroallyl 2-methyl-1-piperidinecarbodithioate. | 25 | Severe phytotoxicity to wild oats, brome grass, rye grass, foxtail, barnyard grass, crab grass and pigweed; moderate phytotoxicity to morning glory and beet-sugar. |
| 2-chloroallyl 2,4,6-trimethyl-1-piperidine-carbodithioate. | 25 | Severe phytotoxicity to morning glory, wild oats, brome grass, rye grass, mustard (radish), beet-sugar, barnyard grass, crab grass and pigweed; moderate phytotoxicity to buckwheat and foxtail. |
| Allyl 2,4,6-trimethyl 1-piperidinecarbodithioate | 5 | Severe phytotoxicity to wild oats, brome grass, rye grass, barnyard grass, crab grass and pigweed. |
| 2-chloroallyl 2,4-dimethyl-1-piperidine-carbodithioate | 5 | Severe phytotoxicity to wild oats, rye grass, crab grass and pigweed; moderate phytotoxicity to morning glory, brome grass and barnyard grass. |
| 2-chloroallyl 2,3-dimethyl-1-piperidine-carbodithioate | 5 | Severe phytotoxicity to wild oats, brome grass, rye grass, barnyard grass, crab grass and pigweed; moderate phytotoxicity to beet-sugar. |
| Cis- and trans-2,3-dichloroallyl 2,4,6-trimethyl-1-piperidine-carbodithioate | 25 | Severe phytotoxicity to wild oats, rye grass, beet-sugar, barnyard grass and crab grass. |
| 2-chloroallyl 1-pyrrolidine-carbodithioate | 5 | Severe phytotoxicity to wild oats, cheat grass, rye grass, beet-sugar and foxtail. |
| 3-chloroallyl 1-pyrrolidine-carbodithioate | 10 | Severe phytotoxicity to wild oats, cheat grass and beet-sugar; moderate phytotoxicity to rye grass and mustard (radish). |
| 2-chloroallyl 2,6-dimethyl-1-piperidine-carbodithioate | 25 | Severe phytotoxicity to pigweed, crab grass, barnyard grass, rye grass and wild oats. |
| Allyl 1,2,3,6-tetrahydropyridinecarbodithioate | 25 | Severe phytotoxicity to pigweed; moderate phytotoxicity to wild oats, rye grass and crab grass. |
| 2,3,3-trichloroallyl 1-hexamethyleniminecarbodithioate | 25 | Severe phytotoxicity to morning glory, crab grass, pigweed and sorghum; moderate phytotoxicity to wild oats, rye grass and foxtail. |
| 2-chloroallyl 1-hexamethyleniminecarbodithioate | 25 | Severe phytotoxicity to morning glory, wild oats, rye grass, radish (mustard), sugar beet, foxtail, crab grass, pigweed, soybean, wild buckwheat, tomato and sorghum. |
| 2,3-dichloroallyl 1-hexamethyleniminecarbodithioate | 25 | Severe phytotoxicity to wild oats, rye grass, foxtail, crab grass, pigweed and sorghum. |
| Allyl 1-hexamethyleniminecarbodithioate | 25 | Severe phytotoxicity to morning glory, wild oats, brome grass, rye grass, sugar beet, foxtail, crab grass, pigweed, soybean and sorghum. |

From these data it is quite apparent that the toxicants shows a marked specific action on weedy grasses and pigweed. In no case were corn or cotton seeds affected by the treatment.

Herbicidal activity on foliage contact is illustrated by the data recorded in Table II. A spray containing the concentration of the active ingredient shown in the table was applied to the foliage of grasses, to the foliage of bean plants and to the foliage of a mixture of broadleaved plants. The mixture is indicated in the table as "Broadleaf."

Table II

| Active ingredient | Percent conc. | Phytotoxicity rating | | |
|---|---|---|---|---|
| | | Grass | Bean | Broadleaf |
| Allyl 1-pyrrolidinecarbodithioate | 0.5 | 2+ | 2 | 3+ |
| 3,3-dichloroallyl 1-pyrrolidine-carbodithioate | 0.5 | 2+ | ¹2 | 3 |
| Cis- and trans-2,3-dichloroallyl 1-pyrrolidinecarbodithioate | 0.5 | 3+ | 1 | 2 |
| Allyl 1-piperidinecarbodithioate | 0.5 | 3 | 2 | 3 |
| | 0.2 | 2 | | 2+ |
| 2-chloroallyl 1-piperidinecarbodithioate | 0.5 | 3 | 2+ | 2+ |
| Cis- and trans-2,3-dichloroallyl 1-piperidinecarbodithioate | 0.5 | 2 | 2+ | 2 |
| 3,3-dichloroallyl 1-piperidine-carbodithioate | 0.5 | 1+ | 1 | 2 |
| 2,3-dichloroallyl 5-ethyl-2-methyl-1-piperidinecarbodithioate | 0.5 | 1 | 2 | 1 |
| 3-chloroallyl 5-ethyl-2-methyl-1-piperidinecarbodithioate | 0.5 | 2 | 3 | 2 |
| | 0.2 | 2 | 1 | 1 |
| Ethyl 5-ethyl-2-methyl-1-piperidinecarbodithioate | 0.5 | 2 | 1 | 2 |
| 2-chloroallyl 2-methyl-1-piperidinecarbodithioate | 0.5 | ²4 | 0 | 3+ |
| | 0.2 | 2 | 1 | 2+ |
| 2-chloroallyl 2,4,6-trimethyl-1-piperidinecarbodithioate | 0.5 | 2 | 2 | 1 |
| 2-chloroallyl 2,4-dimethyl-1-piperidinecarbodithioate | 0.5 | 3 | 1 | 2 |
| 3-chloro-2-butenyl 1-piperidinecarbodithioate | 0.5 | 2+ | 1+ | 2 |
| 2-chloroallyl 1-pyrrolidinecarbodithioate | 0.5 | 3 | ³3 | 3 |
| | 0.25 | 3 | ³2 | 3 |
| | 0.1 | 2 | 1 | 2 |
| 3-chloroallyl 1-pyrrolidinecarbodithioate | 0.5 | 2 | 2 | 1+ |
| 3-chloro-2-butenyl 1-pyrrolidinecarbodithioate | 0.5 | 2+ | 2 | 2+ |

¹ 50% defoliation.  ² Plants dead.  ³ 30% defoliation.

The compounds of this invention may be prepared by condensing a salt of a dithiocarbamic acid with a halide containing the desired ester forming radical. The following illustrates in detail typical methods of preparation:

To a stirred solution comprising 35.6 grams (0.5 mole) of pyrrolidine, 80.0 grams (0.5 mole) of 25% sodium hydroxide and 400 ml. of water was added dropwise at 20–25° C. over a period of 15 minutes 38.0 grams (0.5 mole) of carbon bisulfide. After stirring for one hour, 72.7 grams (0.5 mole) of 1,1,3-trichloro-1-propene was added in one portion. The stirred reaction mixture was heated at 50–60° C. for 3 hours, then cooled to 25° C. and extracted with 400 ml. of ethyl ether. The ether solution was washed with water until neutral to litmus and dried over sodium sulfate. The ether was removed in vacuo at a maximum temperature of 80–90° C./1–2 mm. The 3,3-dichloroallyl 1-pyrrolidinecarbodithioate was an amber liquid obtained in 61.6% yield. Analysis gave 5.8% nitrogen and 24.3% sulfur as compared to 5.5% nitrogen and 25.0% sulfur calculated for $C_8H_{11}Cl_2NS_2$.

19 grams (0.25 mole) of carbon bisulfide was added dropwise at 20–25° C. over a 15 minute period with stirring to a solution comprising 17.8 grams (0.25 mole) of pyrrolidine, 40 grams (0.25 mole) of 25% sodium hydroxide and 200 ml. of water. Next was added 36.3 grams (0.25 mole) of cis- and trans-1,2,3-trichloro-1-propene and the reaction mixture stirred at room temperature for 24 hours. After cooling to 5° C. the precipitate was filtered, washed with cold water until neutral to litmus and air dried at room temperature. The cis- and trans-2,3-dichloroallyl 1-pyrrolidinecarbodithioate was obtained in 73.5% yield as a cream colored solid melting at 40–

41° C. Analysis gave 5.3% nitrogen and 27.8% chlorine as compared to 5.5% nitrogen and 27.7% chlorine calculated for $C_8H_{11}Cl_2NS_2$.

The physical properties of other typical examples prepared in similar manner are summarized in Table III.

Table III

| Compound | Yield, percent | Physical appearance | | Analysis, percent | |
|---|---|---|---|---|---|
| | | | | Calcd. | Found |
| Allyl 1-pyrrolidinecarbodithioate | 72.5 | Amber oil | N | 7.6 | 7.4 |
| Allyl 1-piperidinecarbodithioate | 94.0 | ...do... | N | 7.0 | 6.8 |
| | | | S | 31.9 | 31.6 |
| 2-chloroallyl 1-piperidinecarbodithioate | 99.0 | Solid, M.P. 46–47° C | N | 5.9 | 6.2 |
| | | | S | 27.2 | 27.3 |
| 3,3-dichloroallyl 1-piperidinecarbodithioate | 77.0 | Amber oil | N | 5.2 | 5.1 |
| | | | S | 23.7 | 23.4 |
| | | | Cl | 26.2 | 26.4 |
| 3-chloro-2-butenyl 1-piperidinecarbodithioate | 77.0 | ...do... | N | 5.6 | 5.2 |
| | | | S | 25.7 | 25.5 |
| 2-chloroallyl 2-methyl-1-piperidinecarbodithioate | 78.6 | ...do... | N | 5.6 | 6.7 |
| 2-chloroallyl 5-ethyl-2-methyl-1-piperidinecarbodithioate | 85.6 | ...do... | N | 5.0 | 5.3 |
| 3-chloroallyl 1-pyrrolidinecarbodithioate | 79.6 | ...do... | N | 6.3 | 6.0 |
| | | | S | 28.9 | 28.8 |
| 2-chloroallyl 1-pyrrolidinecarbodithioate | 87.5 | Tan solid, M.P. 45–46° C | N | 6.3 | 6.3 |
| | | | S | 28.9 | 28.7 |
| | | | Cl | 16.0 | 16.3 |
| 3-chloro-2-butenyl 1-pyrrolidinecarbodithioate | 68.0 | Amber oil | N | 5.9 | 5.9 |
| | | | S | 27.2 | 26.5 |
| Cis- and trans-2,3-dichloroallyl 1-piperidinecarbodithioate | | Solid, M.P. 62–75° C | N | 5.2 | 5.3 |
| | | | S | 23.7 | 23.4 |
| Allyl 5-ethyl-2-methyl-1-piperidinecarbodithioate | 98.0 | Dark brown oil | N | 5.8 | 5.5 |
| | | | S | 26.4 | 26.8 |
| 3-chloro-2-butenyl 5-ethyl-2-methyl-1-piperidinecarbodithioate | 90.0 | Dark amber oil | N | 4.8 | 4.2 |
| | | | S | 22.0 | 22.1 |
| | | | Cl | 12.2 | 12.1 |
| 2,3-dichloroallyl 5-ethyl-2-methyl-1-piperidinecarbodithioate | 88.5 | Amber oil | N | 4.5 | 4.9 |
| | | | S | 20.5 | 20.4 |
| 3,3-dichloroallyl 5-ethyl-2-methyl-1-piperidinecarbodithioate | 92.5 | Reddish brown oil | N | 4.5 | 4.8 |
| | | | S | 20.5 | 20.0 |
| | | | Cl | 22.7 | 22.5 |
| 3-chloroallyl 5-ethyl-2-methyl-1-piperidinecarbodithioate | 94.5 | Amber oil | N | 5.0 | 4.8 |
| | | | S | 23.1 | 22.7 |
| | | | Cl | 12.8 | 13.0 |
| 2-chloroallyl 2,4,6-trimethyl-1-piperidinecarbodithioate | 61.0 | ...do... | N | 5.0 | 4.8 |
| | | | S | 23.1 | 22.9 |
| 2-chloroallyl 2,4-dimethyl-1-piperidinecarbodithioate | 92.5 | ...do... | S | 24.3 | 24.3 |
| 2-chloroallyl 2,3-dimethyl-1-piperidinecarbodithioate | 98.0 | ...do... | S | 24.3 | 23.8 |
| Allyl 2,4,6-trimethyl 1-piperidinecarbodithioate | 94.5 | Amber liquid | N | 5.8 | 5.7 |
| | | | S | 26.3 | 26.2 |
| Cis- and trans-2,3-dichloroallyl 2,4,6-trimethyl-1-piperidinecarbodithioate | 87.9 | Viscous amber | N | 4.5 | 4.6 |
| | | | S | 20.5 | 19.9 |
| | | | Cl | 22.7 | 23.1 |
| Methyl 5-ethyl-2-methyl-1-piperidinecarbodithioate | 94.1 | Amber oil | N | 6.4 | 6.8 |
| Ethyl 5-ethyl-2-methyl-1-piperidinecarbodithioate | 97.8 | ...do... | N | 6.1 | 6.2 |
| 2,3,3-trichloroallyl 1-hexamethyleniminecarbodithioate | 91.0 | ...do... | N | 4.4 | 4.5 |
| | | | S | 20.1 | 20.7 |
| | | | Cl | 33.8 | 33.5 |
| 2-chloroallyl 1-hexamethyleniminecarbodithioate | 96.5 | ...do... | N | 5.6 | 5.8 |
| | | | S | 25.7 | 25.7 |
| | | | Cl | 14.2 | 14.6 |
| 2,3-dichloroallyl 1-hexamethyleniminecarbodithioate | 95.0 | ...do... | N | 4.9 | 5.2 |
| | | | S | 22.6 | 22.8 |
| | | | Cl | 24.9 | 24.8 |
| Allyl 1-hexamethyleniminecarbodithioate | 92.5 | ...do... | N | 6.5 | 6.6 |
| | | | S | 29.8 | 29.9 |
| 2-bromoallyl 1-pyrrolidinecarbodithioate | 83.5 | M.P. 51–53° C | N | 5.3 | 5.3 |
| | | | S | 24.1 | 24.2 |
| 2,3,3-trichloroallyl 1-pyrrolidinecarbodithioate | 96.0 | M.P. 60–61° C | N | 4.8 | 4.8 |
| | | | S | 22.0 | 22.4 |
| 3-chloroallyl 1-pyrrolidinecarbodithioate | 90.5 | Amber oil | N | 6.3 | 6.2 |
| | | | S | 28.9 | 28.8 |
| | | | Cl | 16.0 | 15.7 |

It is intended to cover all changes and modifications of the examples of the invention herein chosen for purposes of disclosure which do not constitute departures from the spirit and scope of the invention.

This application is a continuation-in-part of application Serial No. 470,836, filed November 23, 1954, now Patent #2,919,182.

What is claimed is:

1. The method of controlling vegetation which comprises applying thereto a toxic concentration of a phytotoxic ester of a dithiocarbamic acid of the general formula

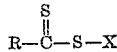

where R represents a saturated hydrocarbon mono-nitrogen mononuclear heterocyclic radical containing from 5 to 7 members inclusive and X represents a lower monoolefinic hydrocarbon radical.

2. The method of controlling vegetation which comprises applying thereto a toxic concentration of a phytotoxic ester of a dithiocarbamic acid of the general formula

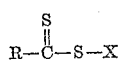

where R represents a saturated hydrocarbon mono-nitrogen mononuclear heterocyclic radical containing from 5 to 7 members inclusive and X represents a halogen substituted lower monoolefinic hydrocarbon radical.

3. The method of controlling vegetation which comprises applying thereto a toxic concentration of allyl 1-pyrrolidinecarbodithioate.

4. The method of controlling vegetation which comprises applying thereto a toxic concentration of 2-chloroallyl 1-pyrrolidinecarbodithioate.

5. The method of controlling vegetation which comprises applying thereto a toxic concentration of allyl 5-ethyl-2-methyl-1-piperidinecarbodithioate.

6. The method of controlling vegetation which comprises applying thereto a toxic concentration of 2-chloroallyl 5-ethyl-2-methyl-1-piperidinecarbodithioate.

7. The method of controlling vegetation which comprises applying thereto a toxic concentration of 2-chloroallyl 2-methyl-1-piperidinecarbodithioate.

8. The method of controlling vegetation which comprises applying to soil medium halogen substituted allyl hexamethyleniminecarbodithioate.

9. The method of controlling vegetation which comprises applying to soil medium lower alkenyl hexamethyleniminecarbodithioate.

References Cited in the file of this patent
UNITED STATES PATENTS

| | | |
|---|---|---|
| 2,919,182 | Harman et al. | Dec. 29, 1959 |
| 2,941,879 | Goodhue | June 21, 1960 |